Nov. 18, 1969  A. W. WARD ET AL  3,479,041
QUICKLY ENGAGEABLE AND DISENGAGEABLE COUPLING OR CHUCK
Original Filed Aug. 4, 1965

INVENTORS.
ABRAHAM W. WARD
RAYMOND T. WHIPPLE
BY
Moses, McGlew & Toren
ATTORNEYS.

United States Patent Office 3,479,041
Patented Nov. 18, 1969

3,479,041
QUICKLY ENGAGEABLE AND DISENGAGEABLE COUPLING OR CHUCK
Abraham W. Ward, 1037 Polk St., San Francisco, Calif. 94109, and Raymond T. Whipple, Paradise, Calif.; said Whipple assignor to said Ward
Original application Aug. 4, 1965, Ser. No. 477,135, now Patent No. 3,384,386, dated May 21, 1968. Divided and this application Sept. 6, 1967, Ser. No. 675,728
Int. Cl. B25g 3/02
U.S. Cl. 279—42          8 Claims

ABSTRACT OF THE DISCLOSURE

Dental surgical blades having flat shanks are interchangeably secured in handles by a quickly releasable and lockable chuck arrangement. The flat shanks are tapered so their greatest width is at their outer ends. A handle is formed with a split sleeve which has a substantially oval cross section at its outer end. The major axis of the oval is that at least equal to the major width of the shank. An outer sleeve is fitted on the handle and embraces the split sleeve. With the split sleeve "released," the shank of the tool is inserted thereinto. The outer sleeve is then threaded inwardly along the handle, and the outer sleeve and the split sleeve are so formed that the split sleeve is compressed to reduce its major diameter to grip the side edges of the shank to releasably lock the shank in the split sleeve. The coupling or chuck is not limited to use with dental tools.

CROSS-REFERENCE TO RELATED APPLICATION

This application is a division of our co-pending application, Ser. No. 477,135, filed Aug. 4, 1965 for "Surgical Knife With Removable Blade," and now U.S. Patent No. 3,384,386, issued May 21, 1968.

BACKGROUND OF THE INVENTION

This invention relates to couplings or chucks, such as used, for example, in well drilling operations, machine tools, and like environments where two or more members are to be disengageably and interchangeably interconnected. More particularly, the present invention is directed to a novel coupling whereby two members may be joined in end-to-end relation by rotation of a sleeve through a relatively small angular displacement, and may be as easily disengaged by similar rotation of the sleeve in the reverse direction.

Couplings of the type to which the present invention is directed are used in many fields. For example, they can be used to interconnect pipe sections in well drilling operations, to readily and interchangeably mount tools in the head of a lathe or the like, and generally as a relatively easily lockable and disengageable chuck. A particular application of the present invention is in the field of oral surgery tools and, by the use of the novel coupling of the present invention, an oral surgery tool may be provided in which blades may be readily and interchangeably engaged and disengaged with respect to a common handle or support. Consequently, the invention will be described hereinafter as applied to a knife for use in oral surgery, but it is desired to emphasize that this is merely by way of describing a specific application of the principles of the invention, and not by way of limitation.

In a representative type of oral surgery knife to which the present invention may be adapted, the knife blade preferably is arranged in angular or oblique relation with respect to the longitudinal axis of its handle, thereby enabling the blade to be used most effectively for operations upon the gum. In its preferred form, the blade is provided with a single bevelled cutting edge, the inside surface of the blade being a planar surface and the outside surface of the blade being smoothly bevelled so that the cutting edge is coincident with the inner planar surface. This enables the blade to be sharpened very easily simply by applying the planar surface to a sharpening stone.

The cutting edges of these knives become worn during use, and also sometimes are broken or otherwise damaged. Consequently, in order not to interrupt an oral surgery, it is necessary that spare or extra knives be kept on hand so that, in the event of excessive wear or of damage of the knife being used, a freshly sharpened knife may be substituted. This is disadvantageous, as it requires a dentist to have a relatively large investment tied up in spare knives.

As a solution to this problem, the novel coupling of the present invention may be incorporated in a novel oral surgery tool wherein knife blades may be readily interchanged in a common handle. Thereby the only investment required, in addition to a single handle, is that necessary for a plurality of knife blades which can be readily and interchangeably used with the same handle. It is, of course, highly desirable that such interchange be effected as quickly as possible, particularly when the dentist is actually in the course of oral surgery.

In the application of the invention to this representative problem, such quick interchange is facilitated by providing novel, easily operable, interengageable wedge surface means on the shank of the knife blade and in the handle, the handle further including the rotatable sleeve of the invention coupling which, in one position, permits ready and easy insertion of the knife blade shank into the handle and, when rotated a small amount, firmly locks the knife blade against disengagement from the handle. In one form of oral surgery tool including the invention coupling, the knife blade is provided with a relatively elongated and substantially flat shank which, in plan, is trapezoidal with its larger base at the end engageable in the handle. A distortable oval split sleeve means is arranged, when having its full oval configuration, to provide for this shank to be inserted into the sleeve means to a predetermined extent. The aforementioned sleeve member, when rotated, distorts the sleeve means from its full oval position to on more nearly approaching a circular condition, thereby firmly clamping the blade against withdrawal from the hardle.

For an understanding of the principles of the invention, reference is made to the following description of typical embodiments thereof as illustrated in the accompanying drawings.

DESCRIPTION OF THE PREFERRED EMBODIMENT

Figures 1, 2:
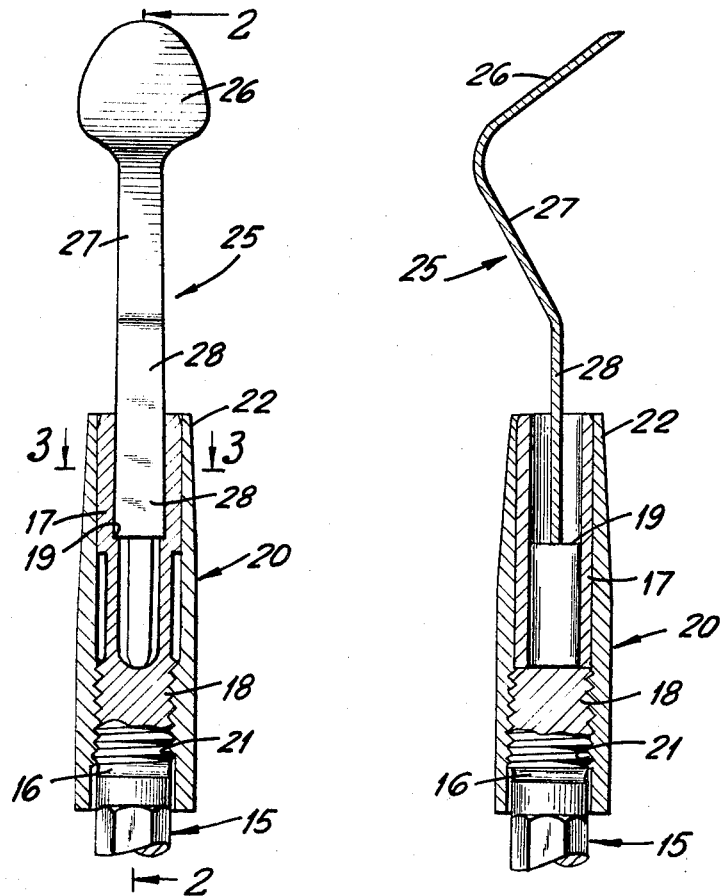
FIG. 1 is an axial sectional view through a knife blade and the cooperating part of a handle, illustrating one embodiment of the invention coupling.
FIG. 2 is a sectional view taken on the line 2—2 of FIG. 1.
Figure 3:
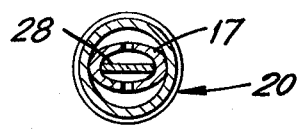
FIG. 3 is a transverse sectional view taken on the line 3—3 of FIG. 1.

FIGS. 1, 2 and 3, a handle 15, which is arranged to receive surgical blades interchangeably is illustrated as including a stem 16 whose outer end is formed as a split sleeve 17 having, as illustrated particularly in FIG. 3, a generally oval cross section. Split sleeve portion 17 extends from a threaded neck 18 of stem 16, and the threads of neck 18 are arranged to engage the internal threads 21 of sleeve 20. Sleeve 20 has a reduced diameter outer end 22 whose internal surface is tapered or conically diverging inwardly. Consequently, when sleeve 20 is screwed down onto stem 16, it will compress oval cross section split sleeve 17 to decrease its major diameter and increase its minor diameter. The purpose of this will become clear as the description proceeds.

A typical surgical blade which is interchangeably engageable in handle 15 is illustrated at 25 as including an outer knife portion 26 having at least one bevelled or sharpened edge, an intermediate leg 27 extending from knife portion 26, and a shank 28. Knife portion 26 extends at substantially a right angle, as viewed in FIG. 2, with respect to intermediate leg 27, and leg 27 extends at an angle of the order of 45° with respect to shank 28. As particularly apparent in FIG. 1, shank 28 is tapered or trapezoidal in plan, with its inner end being wider than its junction with intermediate leg 27.

FIGS. 1, 2 and 3 show the parts in the blade clamping position in which sleeve 20 has been screwed in along stem 15. To exchange blades, sleeve 20 is screwed outwardly relative to stem 16 and split sleeve portion 17 expands to the full extent of its major axis, which is slightly in excess of the width of the inner end of shank 28 of blade 25. Under these conditions, blade 25 may be withdrawn and another blade may be inserted until its shank 28 seats on shoulders 19 formed in split sleeve portion 17. Sleeve 20 is then screwed inwardly along stem 16, and, due to the tapered configuration of the inner surface of sleeve 20, split sleeve portion 17 will be compressed in a direction parallel to its major axis so that it will closely embrace the side edges of shank 28, as illustrated in FIG. 3. This increases the minor diameter of split sleeve portion 17. The blade is now firmly clamped in position.

It will thus be seen that the present invention comprises a novel coupling or chuck whereby two rods, tubular sleeves, or the like may have their ends quickly and easily connected together and as quickly and easily disconnected from each other in an efficient manner with positive locking of the adjacent ends of the two elements to each other. Both locking and release are effected by only a slight relative rotary movement or angular displacement of a sleeve. As particularly applied to oral surgery tools, machine tool chucks, and the like, the invention comprises a coupling wherein tools or blades may be interchangeably secured in a chuck or handle in an easy, quick and efficient manner with positive locking of the tool or blade in the chuck or handle. Release and interchange of tools or blades is made possible by only a slight relative rotary movement or angular displacement of a sleeve, and locking is effected in the same way.

What is claimed is:

1. A coupling or chuck arrangement for quick coupling and uncoupling of elements, comprising in combination, a first element having a relatively elongated split sleeve of substantially oval cross section at one end; a second element connectible to said first element and having a relatively elongated substantially flat shank insertable into said split sleeve, said shank tapering in width so that its greatest lateral dimension is at its end; the lateral dimension of the end of said shank being not greater than the normal major inner diameter of said split sleeve, whereby said shank may be inserted into said split sleeve; and an outer sleeve threaded on said first element and embracing said split sleeve, said split sleeve and said outer sleeve being conjointly formed in such a manner that, as said outer sleeve is threaded along said first element, said split sleeve is compressed to reduce its major inner diameter to grip the side edges of said shank to releasably lock said shank in said split sleeve.

2. A tool for oral surgery comprising, in combination, a relatively elongated handle having a relatively elongated split sleeve of substantially oval cross section at one end; a tool interchangeably engageable in said handle and having a relatively elongated substantially flat shank insertable into said split sleeve, said shank tapering in width so that its greatest lateral dimension is at its inner end; the lateral dimension of the inner end of said shank being not greater than the normal major inner diameter of said split sleeve, whereby said shank may be inserted into said split sleeve; and an outer sleeve threaded on said handle and embracing said split sleeve, said split sleeve and said outer sleeve being conjointly formed in such a manner that, as said outer sleeve is threaded along said handle, said split sleeve is compressed to reduce its major inner diameter to grip the side edges of said shank to releasably lock said shank in said split sleeve.

3. A coupling or chuck arrangement for quick coupling and uncoupling of elements, comprising in combination, a first element having a relatively elongated split sleeve of substantially oval cross section at one end; a second element connectible to said first element and having a relatively elongated substantially flat shank insertable into said split sleeve, said shank tapering in width so that its greatest lateral dimension is at its end; the lateral dimension of the end of said shank being not greater than the normal major inner diameter of said split sleeve, whereby said shank may be inserted into said split sleeve; and an outer sleeve threaded on said first element and embracing said split sleeve, said split sleeve and said outer sleeve being conjointly formed in such a manner that, as said outer sleeve is threaded along said first handle, said split sleeve is compressed to reduce its major inner diameter to grip the side edges of said shank to releasably lock said shank in said split sleeve; said split sleeve having a transverse shoulder thereon intermediate its ends arranged to seat the inner end of said shank.

4. A tool for oral surgery comprising, in combination, a relatively elongated handle having a relatively elongated split sleeve of substantially oval cross section at one end; a tool interchangeably engageable in said handle and having a relatively elongated substantially flat shank insertable into said split sleeve, said shank tapering in width so that its greatest lateral dimension is at its inner end; the lateral dimension of the inner end of said shank being not greater than the normal major inner diameter of said split sleeve, whereby said shank may be inserted into said split sleeve; and an outer sleeve threaded on said handle and embracing said split sleeve, said split sleeve and said outer sleeve being conjointly formed in such a manner that, as said outer sleeve is threaded along said handle, said split sleeve is compressed to reduce its major inner diameter to grip the side edges of said shank to releasably lock said shank in said split sleeve; said split sleeve having a transverse shoulder thereon intermediate its ends arranged to seat the inner end of said shank.

5. A tool for oral surgery comprising, in combination, a handle having a relatively elongated split sleeve of substantially oval cross section at one end; a tool interchangeably engageable in said handle and having a relatively elongated substantially flat shank insertable into said split sleeve, said shank tapering in width so that its greatest lateral dimension is at its end; the lateral dimension of the end of said shank being not greater than the normal major inner diameter of said split sleeve, whereby said shank may be inserted into said split sleeve; and an outer sleeve threaded on said handle and embracing said split sleeve, said split sleeve and said outer sleeve being conjointly formed in such a manner that, as said outer sleeve is threaded along said handle, said split sleeve is compressed to reduce its major inner diameter to grip the side edges of said shank to releasably lock said shank in said split sleeve; said split sleeve being integral with said handle.

6. A coupling or chuck arrangement for quick coupling and uncoupling of elements, comprising in combination, a first member having a relatively elongated split sleeve of substantially oval cross section at one end; a second member connectible to said first member and having a relatively elongated substantially flat shank insertable into said split sleeve, said shank tapering in width so that its greatest lateral dimension is at its end; the lateral dimension of the end of said shank being not greater than the normal major inner diameter of said split sleeve, whereby said shank may be inserted into said split sleeve; and an outer sleeve threaded on said first member and embracing said split sleeve, said split sleeve and said outer sleeve being conjointly formed in such a manner that, as said outer sleeve is threaded along said first member, said split sleeve is compressed to reduce its major inner diameter to grip the side edges of said shank to releasably lock said shank in said split sleeve; the inner surface of said outer sleeve being tapered whereby to compress said split sleeve to reduce the major inner diameter thereof as said outer sleeve is threaded along said first member.

7. A tool for oral surgery comprising, in combination, a relatively elongated handle having a relatively elongated split sleeve of substantially oval cross section at one end; a tool interchangeably engageable in said handle and having a relatively elongated substantially flat shank insertable into said split sleeve, said shank tapering in width so that its greatest lateral dimension is at its inner end; the lateral dimension of the inner end of said shank being not greater than the normal major inner diameter of said split sleeve, whereby said shank may be inserted into said split sleeve; and an outer sleeve threaded on said handle and embracing said split sleeve, said split sleeve and said outer sleeve being conjointly formed in such a manner that, as said outer sleeve is threaded along said handle, said split sleeve is compressed to reduce its major inner diameter to grip the side edges of said shank to releasably lock said shank in said split sleeve; the inner surface of said outer sleeve being tapered whereby to compress said split sleeve to reduce the major inner diameter thereof as said outer sleeve is threaded along said handle.

8. A coupling or chuck, for mounting a tool or the like having a relatively elongated substantially flat shank tapering in width so that its greatest lateral dimension is at the end of the shank; said coupling or chuck comprising a first element having a relatively elongated split sleeve of substantially oval cross section at one end, with the sleeve having a normal major diameter greater than the lateral dimension of the end of a shank of a tool; said sleeve being arranged to have the shank of a tool inserted thereinto; and an outer sleeve threaded on said first element and embracing said split sleeve, said split sleeve and said outer sleeve being conjointly formed in such a manner that, as said outer sleeve is threaded along said first element, said split sleeve is compressed to reduce its major inner diameter to grip the side edges of a tool shank inserted thereinto to releasably lock the shank in said split sleeve.

References Cited

UNITED STATES PATENTS

| | | | |
|---|---|---|---|
| 386,263 | 7/1888 | Pedersen | 279—42 |
| 2,042,376 | 5/1936 | Balga | 279—89 |

ROBERT C. RIORDON, Primary Examiner

U.S. Cl. X.R.

30—338